G. A. BERTSCH.
COMBUSTION CHAMBER AND MEANS FOR CONTROLLING THE ADMISSION OF FUEL THERETO.
APPLICATION FILED JUNE 7, 1916.
1,232,481.
Patented July 10, 1917.
5 SHEETS—SHEET 1.
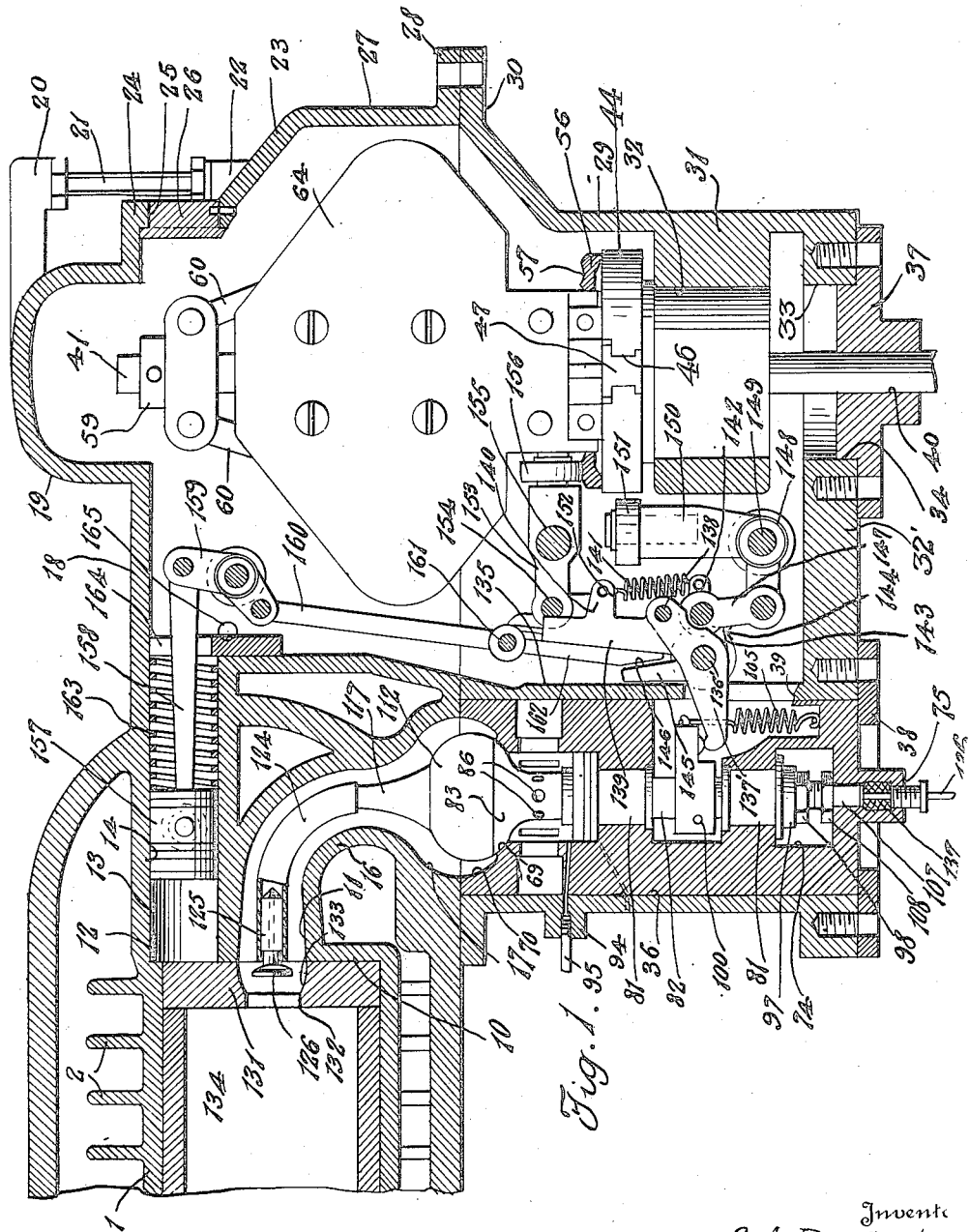
Witness:
C. H. Trotter.
Inventor
G. A. Bertsch.
By
Attorney

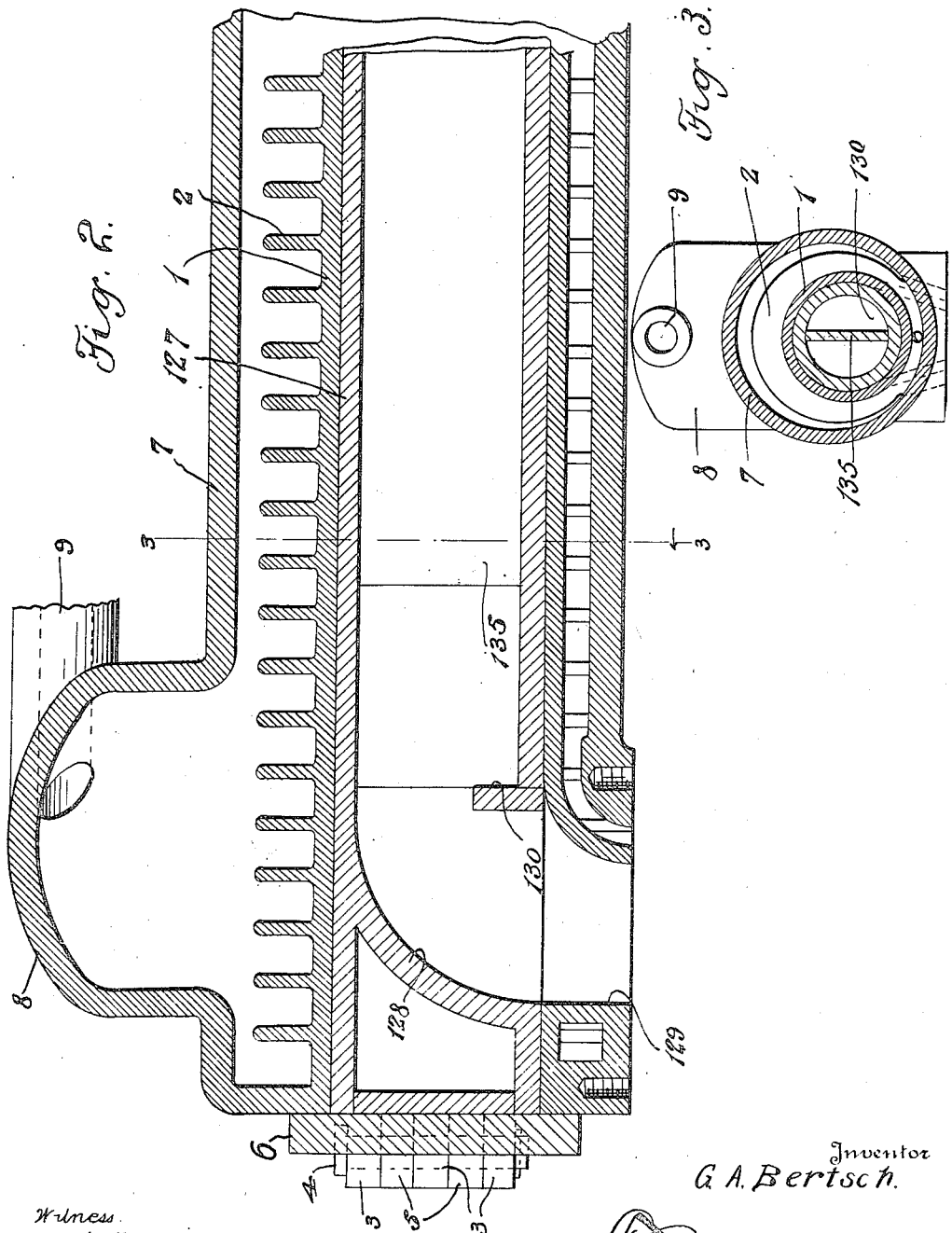

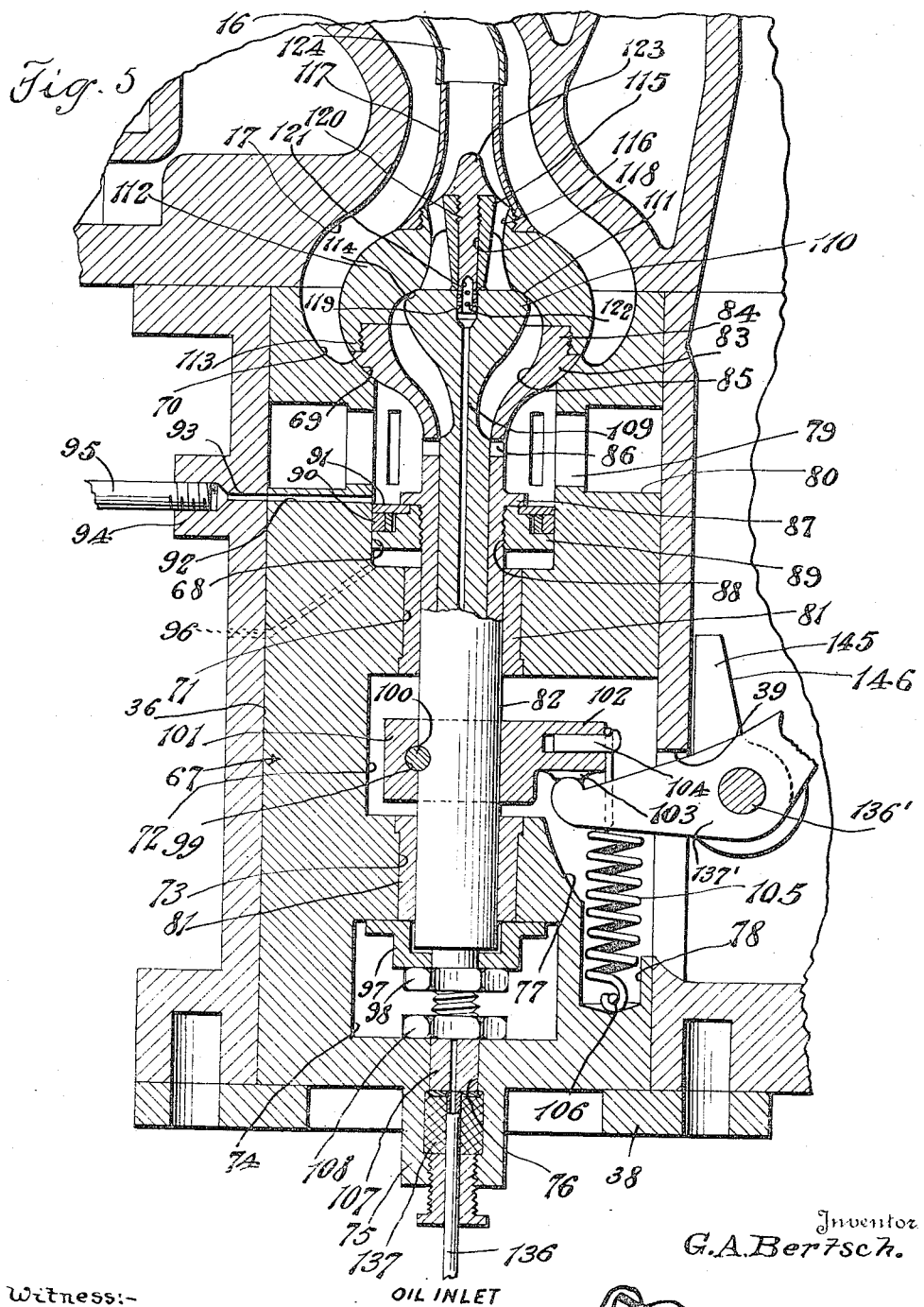

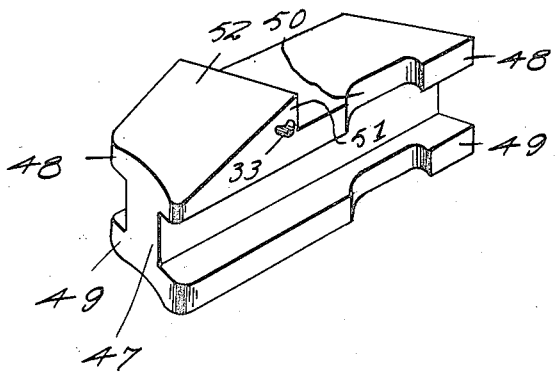
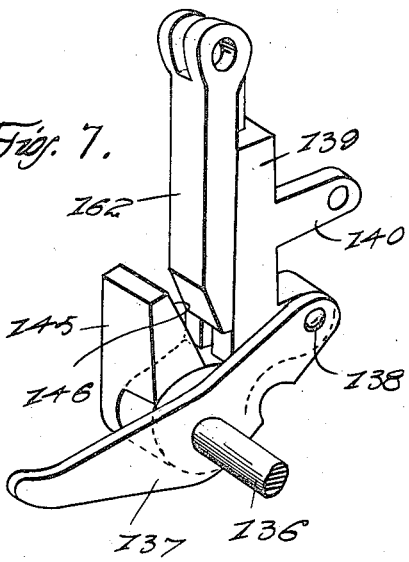
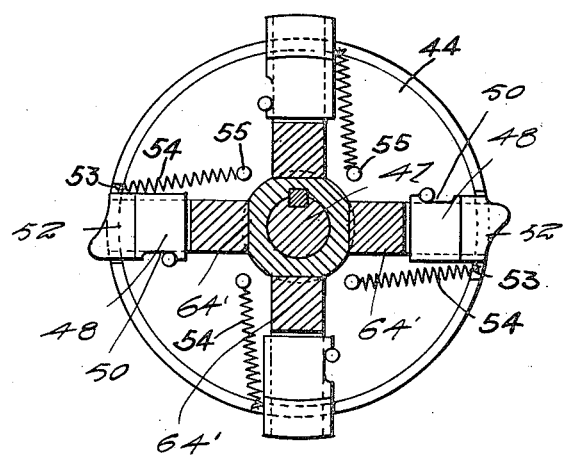

UNITED STATES PATENT OFFICE.

GEORGE A. BERTSCH, OF PROVIDENCE, RHODE ISLAND.

COMBUSTION-CHAMBER AND MEANS FOR CONTROLLING THE ADMISSION OF FUEL THERETO.

1,232,481.　　　　　Specification of Letters Patent.　　Patented July 10, 1917.

Application filed June 7, 1916. Serial No. 102,248.

*To all whom it may concern:*

Be it known that I, GEORGE A. BERTSCH, a citizen of the United States, residing at Providence, in the county of Providence and State of Rhode Island, have invented certain new and useful Improvements in Combustion-Chambers and Means for Controlling the Admission of Fuel Thereto; and I do hereby declare the following to be a full, clear, and exact description of the invention, such as will enable others skilled in the art to which it appertains to make and use the same.

This invention relates to new and useful improvements in combustion chambers and means for admitting fuel thereto and the principal object of the invention is to provide a chamber for burning gases in order to increase their pressure previous to their entrance into a rotary motor.

Another object of the invention resides in the provision of a means for controlling the admission of fuel to the combustion chamber which is controlled by the speed of rotation of the motor and also by the pressure within the chamber.

A still further object of the invention is to provide a novel means for mixing the fuel with a proper amount of air before the same enters the chamber to insure the proper combustion.

A further object of the invention is to provide a device having a water cooled combustion chamber so that the degrees of heat may be regulated.

A still further object of the invention is to provide a combustion chamber having a firebrick lining and provided with a longitudinally extending central partition wall to separate the combustion chamber into two separate compartments so as to insure the rapid combustion of the fuel.

A further object of the invention resides in the provision of a novel means for mixing the air with the fuel which means also constitutes the valve by which the charges are admitted to the combustion chamber.

With these and other objects in view, the invention consists in the novel combination and arrangement of parts which will be fully set forth in the following specification and accompanying drawings, in which:—

Figure 1 is a longitudinal sectional view through the rear end of the chamber showing the fuel controlling mechanism in place.

Fig. 2 is a view of the forward end of the chamber similar to Fig. 1 showing the outlet port.

Fig. 3 is a sectional view on line 3—3 of Fig. 2.

Fig. 5 is an enlarged vertical sectional view through valve, fuel and air mixer.

Fig. 6 is a detail perspective view of one of the lifting cams.

Fig. 7 is a detail perspective view of the valve lifting mechanism, and

Fig. 8 is a horizontal sectional view on line 8—8 of Fig. 4.

Figure 4:
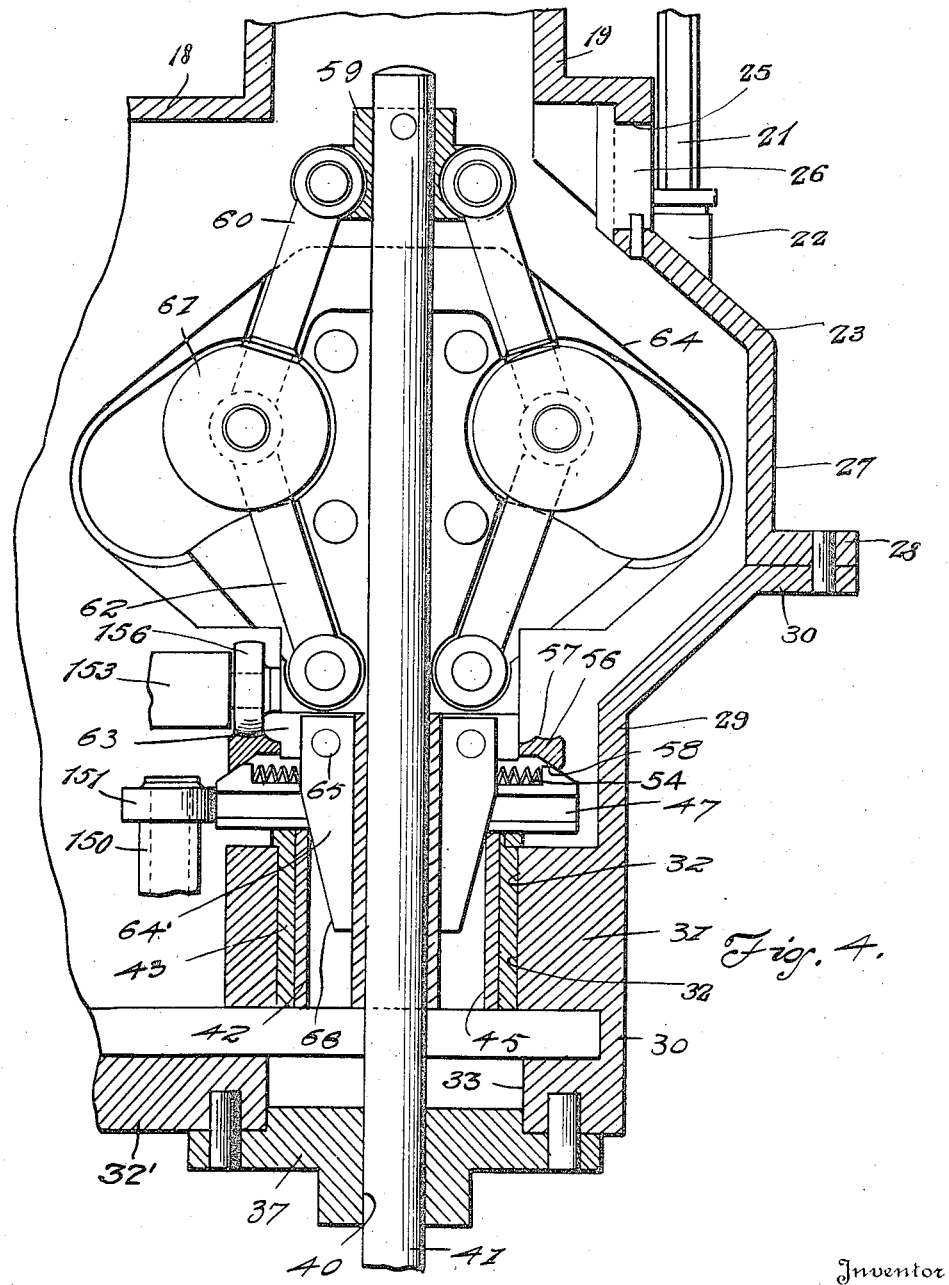
Fig. 4 is an enlarged sectional view through the governor by which the admission of fuel is controlled.

Referring to the drawings, the numeral 1 designates the shell or wall of the combustion chamber provided with the spaced peripheral radiating flanges 2. The forward end of this shell is formed with the spaced ears 3 which are arranged in vertical alinement and provided with openings for the reception of the pivot pin 4 which projects through the ears 5 formed integrally on the periphery of the end closure or door 6. It will thus be seen that the door 6 will be hingedly connected to the shell so as to close the forward open end of the combustion chamber. A water jacket 7 is formed integrally with the shell 1 and completely surrounds the same so as to maintain a complete circulation of water around the combustion chamber which will absorb a portion of the heat to prevent the device from becoming overheated. A dome 8 is formed near the forward end of the water jacket and has connected thereto the pipe 9 which forms the heated water outlet for the device so as to facilitate the circulation of the liquid within the water jacket. The inner or rear end of the combustion chamber is closed by the wall 10 which is formed with the central opening 11 and has formed near its upper edge the opening 12 which communicates with the bore 13 of the cylinder 14 the use of which will appear as the description proceeds. As shown in Fig. 1 it will be seen that the water jacket 7 continues back so as to practically completely include the cylinder 14 in order to prevent the same from becoming excessively heated. The central opening 11 communicates with the passage 15 formed by the wall 16 which curves downwardly as illustrated in Fig. 1 and curves outwardly so as to form the flared portion 17 of the passage at the lower terminal thereof. The upper portion of the wall of the cylinder 14 extends rearwardly as at 18 to form a housing for the upper part of the governor and the rocker arm which will be more fully hereinafter described. A dome 19 is formed near the rear end of the wall 18 and is formed with the pipe 20 which bends downwardly as illustrated in Fig. 1 and forms a retaining sleeve for the glass 21. The lower end of the glass is retained in the retaining sleeve 22 formed on the inclined portion 23 of the wall 18 which is provided with the offset 24 near the point where it joins the dome at the rear end, which offset portion is provided with an opening 25 closed by the plug 26. The vertical wall 27 which is formed integral at the lower edge of the wall 23 terminates at its lower end in the outwardly extending annular flange 28 which is apertured to receive suitable attaching bolts by means of which the lower portion of the housing for the governor and valve mechanism is supported.

The housing for the governor and valve mechanism comprises the substantially circular wall 29 formed at its upper edge with the flange 30 which coöperates with the flange 28 in receiving the attaching bolt and this wall 29 is formed at its rear end with the inwardly extending enlarged portion 31 having the vertical bore 32 extending therethrough. The lower end of the chamber formed by the wall 29 is closed by a wall 32' which is formed with a bore 33 which alines with the bore 32 to give access to the governor bearings carried in the enlargement 31. A vertical enlargement or cylinder 35 is formed at a point diametrically opposite the enlargement 31 and is provided with the vertical bore 36 which extends through the bottom wall 32' and is adapted to receive the valve and mixing mechanism which will be more fully hereinafter described. The bore 33 is closed by a suitable plug 37 while the lower end of the bore 36 is surrounded by the retaining ring 38, which ring is adapted to engage the under side of the valve mechanism to support the same in proper place. As shown in Fig. 1 it will be seen that the side of the cylinder 35 near the enlargement 31 is provided with a vertical slot 39 for the accommodation of the bell crank lever to be more fully hereinafter described. The plug 37 is provided with the central axial bore 40 for the reception of the drive shaft of the governor as clearly illustrated in the drawings.

Passing now to the detail description of the governor reference will be had particularly to Fig. 4. The governor shaft is designated by the numeral 41 and as hereinbefore described extends through the opening 40 into the housing or casing 29. This shaft projects up into the dome 19 formed on the casing 18 and has secured near its lower end the sleeve 42 which is journaled in the bushing 43 formed of any suitable bearing metal which bushing seats in the opening 32 of the enlargement 31. The upper end of the sleeve 42 is provided with an outwardly extending flange 44 which engages the upper edge of the bushing 43 and limits the downward movement of the shaft. The sleeve 42 is formed with the vertical apertures 45 which extend through the flange 44 and are adapted to accommodate the wedges which will be more fully hereinafter described. The apertures 45 are arranged at right angles to each other and have communicating therewith at their upper ends the radially extending grooves 46 in which the cams to be more fully hereinafter described are slidably mounted.

The cams above referred to are best illustrated in Fig. 6 and each comprises the main body 47 provided on opposite sides with the upper and lower flanges 48 and 49 respectively. The forward end of the body 47 is shaped as illustrated in Figs. 6 and 8 and the flanges 48 and 49 on the shorter side of the device are notched as at 50 to receive the stop pins 51 which limit the inward and outward movement of the cams. The inner faces of these cams are inclined as illustrated in Fig. 4 to conform to the inclination of the active faces of the wedges which will be more fully hereinafter described. Formed at the forward ends of the cams 47 are the enlargements 51 which project upwardly from the upper faces of the cams and are provided with the inclined upper faces 52 as clearly illustrated in Figs. 4 and 7. A suitable hook 53 projects outwardly from the enlargement 51 on the side opposite the notch 50 and is adapted to form a connection for the forward or outer end of the retractile coil spring 54, the inner or rear end of which is connected to the pin 55 which projects upwardly from the flange 44. It will thus be seen that the springs will tend to move the cams inwardly against the faces of the wedges.

A suitable ring 56 provided on its upper face with an annular groove or track 57 is provided and the under face of this ring is recessed to provide the inclined wall 58 which rests upon the inclined portions 52 of the cams 47. It will thus be seen that when these cams move inwardly the ring will be permitted to descend and when said cams move outwardly the ring will be raised thus causing the roller which bears on the track 57 to move according to the direction of movement of the ring.

Secured to the upper end of the shaft 41 and rotatable therewith is the collar 59 to which are pivoted the governor arms 60 carrying at their outer ends the governor balls 61. The links 62 are pivoted to said governor balls and the lower ends thereof are pivotally connected within the sleeve 63 formed at the lower end of the governor housing 64. It will thus be seen that as the governor balls or weights 61 move outwardly the housing will be lifted. As shown in Fig. 4 the wedges designated by the numeral 64 are pivoted as at 65 to the lower end of the collar 63 and provided with the upwardly and outwardly inclining faces 66 which engage the inclined ends of the cams 47 as clearly illustrated in Fig. 4. It will thus be seen that upon the upward movement of the housing 64 the wedges 64' will move upwardly thereby permitting the cams 47 to move inwardly under the influence of the springs 54. As shown in Fig. 6 the cams 47 are arranged in two sets and in diametrically opposed relation or arranged so that the alternate cams present the curved face hereinbefore described while the opposite cams are provided with ordinary smooth faces as illustrated in the drawings.

Passing now to the description of the combination valve and fuel and air mixer reference will be had particularly to Fig. 5 which clearly illustrates each and every feature of this valve in detail. The valve body is designated generally by the numeral 67 and this body is circular in cross section and provided with an axial bore 68 which extends thereinto for a distance equal to substantially one-third of the length of the body. The upper end of this bore is flared as shown to form the valve seat 69 and again flared as at 70 to provide a passage, the wall of which alines with the wall of the passage 17. Formed at the lower terminal of the bore 68 is a reduced bore 71 which extends downwardly for a short distance and opens into the chamber 72 which opens outwardly through one side of the body 67 as clearly shown in the drawings and a suitable reduced bore 73 communicates with the lower end of the chamber and extends downwardly to a point slightly above the lower end of the valve body where it opens into the chamber 74. A hollow boss 75 is formed on the lower terminal of the valve body and a reduced axial bore 76 establishes communication between the hollow boss 75 and the chamber 74 as clearly illustrated in the drawings. A groove 77 is formed in the valve body and establishes communication between the chamber 72 and the slots 39 formed in the wall 35. A suitable bore 78 is formed in the bottom wall of the groove 77 and in parallel relation with the bore 73 for accommodating the lower end of the coil spring to be more fully hereinafter described. A plurality of radial apertures 79 are formed in the valve body near the upper end and the inner ends of these apertures communicate with the chamber 68 as clearly shown in the drawings.

The outer ends of these radial openings 79 communicate with the annular chamber or recess 80 formed in the periphery of the valve body near its upper terminal and these openings form air passages through which compressed air is admitted to the passage 15 and into the oil and air mixing valve.

Secured in the bores 71 and 73 are suitable bushings 81 which form bearings for slidably supporting the hollow valve stem 82. This valve stem is provided at its upper end with the head 83 having the threaded flange 84 formed at its upper terminal and this head is provided with the flared opening 85 which communicates with the interior of the hollow stem as clearly shown in the drawings. Suitable diametrically arranged openings 86 are formed in the valve stem immediately beneath the point where the head joins the same and these openings form air passages for admitting the air to the interior of the flared opening 85 when the valve stem is lifted. The flange 87 is formed on the valve stem slightly below the openings 86 and a threaded portion 88 is formed immediately beneath the flange 87 on which the piston 89 is threaded. This piston is provided with the packing ring 90 and a suitable retaining ring 91 surrounds the upper reduced end of the piston and is clamped between the piston and the flange 87 for retaining the ring 90 in place. It will thus be seen that there is no possibility of the air contained within the chamber 80 escaping around the valve stem. An air inlet port designated by the numeral 92 is formed in the valve casing 67 and the inner end of said port communicates with the chamber 68 immediately above the piston 89 while the outer end of said ports communicates with the passage 93 formed in the shell or housing 29 and this port or passage 93 communicates with the interior of the hollow boss 94 into which the air pressure feed pipe 95 is threaded. A vent 96 opens into the lower end of the bore 68 beneath the piston 89 so that any air within this space could not interfere with the operation of the device. The lower terminal of the valve stem 82 projects into the chamber 74 and is limited in its downward movement by the cap or yoke 97 which is held in adjusted position within the chamber by means of the nut 98 which is threaded on the fuel feed pipe to be more fully hereinafter described. Formed in the valve stem 82 is a transversely extending keyway 99 for the reception of the key or pin 100 which projects partially into the collar 101 which surrounds the valve stem within the chamber 72. This collar is provided with the arm 102 having formed on its under face the bearing surface 103 which is adapted to be engaged by the rocker arm or lift arm which will be more fully hereinafter described. A pin 104 projects into the arm 102 and forms a hook upon which the upper hooked end of the spring 105 is attached. The lower end of the spring 105 is secured to the transversely extending pin 106 which is arranged in the lower end of the bore 78 and it will thus be seen that the spring will tend to hold the valve in closed position.

The fuel feed pipe is designated by the numeral 107 and extends into the bore 76 for a short distance and this pipe is threaded on the exterior at a point which will bring the threads in the chamber 74 and these threads are adapted to receive the adjusting nut 108 and the nut 98 so that the position of the pipe may be varied to suit varying requirements. The upper end of the fuel pipe 107 is provided with the reduced neck 109 having the head 110 formed at its upper terminal. The wall of the neck and head together with the inner face of the wall 83 and flange 84 of the head at the upper end of the valve stem form an annular passage the use of which will appear as the description proceeds. The upper outer edge of the head 110 is inclined as at 111 to form a valve for engagement against the valve seat formed in the cap to be more fully hereinafter described.

The cap above referred to consists of a substantially dome shaped body 112 formed at its lower end with the internally threaded flange 113 which is adapted to be threaded on to the flange 84 as clearly shown in Fig. 5. The cap is formed at 114 with a valve seat which engages the valve 111 and formed centrally of said cap is an inwardly extending, downwardly tapering stem 115 which is connected to the main body of the cap by the web portions 116. It will thus be seen that the central passage through the cap communicates with the interior of the fuel outlet nozzle through the openings formed between the web portions 116. The nozzle above referred to is designated by the numeral 117 and comprises a hollow frustoconical member, the lower end of which is threaded on to the cap as clearly shown in the drawings. Formed in the stem 115 is an axial opening 118 which alines with the enlarged bore 119 formed in the upper end of the head 110 and this bore is adapted to receive the plug 120 which is formed at its lower terminal with the axial bore 121 and which projects into the bore 119. Suitable outlet openings 122 are formed in the portion of the plug 118 which extends below the lower terminal of the stem 115 and it will thus be seen that when the valve stem 82 moves upwardly the cap will also rise thereby establishing communication between the bore 119 and the passage through the cap. The upper end of the plug 120 is formed with a suitable head 123 which is shaped to assist in the proper mixing of the fuel with the inflowing air.

From the foregoing it will be apparent that upon movement of the rocker arm which bears against the under side of the arm 102 the valve stem 82 will be raised carrying with it the head 83 and cap 112. The upward movement of the stem will cause the port 86 to establish communication between the bore 68 and the passage surrounded by the walls 85 and 109 thereby allowing the air which is in the bore 68 to flow into the passage and around the valve 111 and valve seat 114 into the passage in the cap from whence it is passed upwardly and into the pipe 117. Simultaneously with the opening of the valve in the manner described the plug 120 will be moved upwardly thereby allowing the inflowing oil entering the bore 119 to pass out through the opening 122 into the passage in the cap from whence it is mixed with the air and carried into the pipe 117 and thence directed into the furnace, as will be more fully hereinafter described.

The upper end of the nozzle 117 is arranged to enter the lower end of the fuel pipe 124 which is arranged centrally of the passage 15. This fuel pipe conforms to the shape of the passage and is provided at its forward end with the plug 125 having formed centrally thereof an axial bore and this plug carries at its forward end the deflector plate 126 by means of which the fuel is spread as it enters the combustion chamber.

The combustion chamber above referred to and previously described as 1 is lined with a suitable firebrick lining designated by the numeral 127 which consists of a tube arranged to fit within the shell 1 and the forward end of the shell has fitted therein the lining 128 of a suitable firebrick, the inner wall of which curves downwardly so as to establish communication between the outlet port 129 of the combustion chamber with the interior of said chamber. A suitable firebrick wall 130 is secured within the lining immediately behind the outlet port 129 to form a bridge wall and prevent overheated gases from passing into the motor.

The rear end of the cylindrical shell 1 is provided with the disk 131 formed of a suitable firebrick which is provided with the central opening 132 having the rearwardly flaring portion 133 which establishes communication between the passage 15 and the combustion chamber. A suitable opening 134 is formed in the disk 131 and is arranged to aline with the opening 12 so as to establish communication between the cylinder 13 and the combustion chamber. Extending longitudinally through the combustion chamber from the forward face of the firebrick disk 131 to a point slightly in the rear of the wall 130 is the vertical partition wall 165 which separates the chamber into two separate compartments.

The fuel is admitted to the pipe 107 through the fuel pipe 136 which is held in place by the packing gland 137. It will thus be seen that the fuel will enter the pipe 107 from the pipe 136 and the possibility of leakage of the fuel will be avoided.

Passing now to the description of the operating mechanism by which the valves are controlled reference will be had particularly to Fig. 1 which illustrates in detail the mechanism above referred to. Extending through the casing 29 and having its axis disposed at right angles to the longitudinal axis of the extension 102 of the collar 101 is the shaft 136'. Mounted on said shaft is the lift arm 137' the forward end of which engages the bearing plates 103 of the arm 102 while the rear end of said lift arm is pivoted at 138 to an ear formed on the arm 139 which is pivoted on the shaft 136. A rearwardly extending finger 140 is formed on the arm 139 near its upper end and has connected thereto the retractile coil spring 141 the lower end of which is connected to the ear 142 which is formed on the rearwardly extending arm 143 of the rocker designated generally by the numeral 144. Formed integrally with the rocker and extending upwardly therefrom in a plane substantially at right angles to the axis of the arm 143 is the arm 145 provided with the inclined inner face 146 the use of which will appear as the description proceeds. A link 147 is pivoted to the rear end of the arm 143 and the lower terminal of said link is pivoted to the forwardly extending arm of the rocker 148 which is pivoted on the shaft 149 which extends parallel to the shaft 136'. A vertical arm 150 is formed on the rocker 148 and carries at its upper end the roller 151 which engages the periphery of the flange 44 and the cams 47. A relatively long link 152 is pivoted at its lower end to the forward end of the forwardly extending arms of the rocker 148 and the upper end of said link 152 is pivoted as at 153 to the forward end of the lever 154 which is pivoted on the stationary pivot 155 the axis of which is disposed in parallel relation to the axis of the shafts 136 and 149. The rear end of the lever 154 carries a roller 156 which bears on the ring 56 and travels in the groove 57 formed on the upper face thereof. It will thus be seen that when the ring moves upwardly the lever 154 will move the link 152 downwardly thereby causing the rocker arm 144 to move the arm 145 inwardly and when the pressure actuated wedge to be more fully hereinafter described is in proper position it will be seen that the arm 139 will swing the lift arm 137' to lift the valve stem and thereby open the valve to permit a fresh charge to the combustion chamber. In order to provide a means for automatically actuating the wedge controlled by the pressure within the combustion chamber, a piston 157 is operable within the cylinder 14. A suitable connecting rod 158 is connected at its forward end to the piston and to its rear end to the rocker arm 159. The forward end of this rocker arm has connected thereto the link 160 which is pivotally connected as at 161 to the wedge 162. This wedge block 162 is slidable in a dovetail groove formed in the forward face of the arm 139 and forms a filler which when in its lowered position is engaged by the inclined face 146 of the arm 145. In order to tend to lower the block into operative position a compression coil spring 163 bears against the rear end of the piston 157 and the rear end of said coil spring bears against the forked member 164 which is held in place at the extreme rear end of the cylinder by a suitable pin 165.

It will be apparent from the foregoing that in use the shaft 41 is driven from the motor and the rotation of the motor will cause the governor balls 61 to swing outwardly thereby lifting the ring 56 and allowing the lever 154 to move downwardly which movement will cause the rocker 144 to swing the arm 145 toward the arm 139. If the pressure in the combustion chamber is below a predetermined point it will be seen that the spring 63 will have moved the piston forward so that the link 160 will cause the wedge block 162 to move downwardly and upon inward movement of the arm 145 it will be seen that the arm 139 will be moved on its pivot to cause the lift arm 137 to raise the lift collar 101 and thereby move the valve off of its seat thus allowing the fuel and air to enter the combustion chamber. The fuel and air is then ignited through any suitable means not shown and it will be seen that the pressure will be immediately raised so that the gases will seek an outlet whereupon they will pass out through the port 129 into the motor. The raising of the pressure in the combustion chamber will cause the piston 157 to move rearwardly thereby operating the rocker arm 159 to raise the link 160 which in turn will pull the wedge block 162 upwardly and it will be seen that upon the movement of the arm 145 the inclined face 146 thereof will not contact with the wedge block 162 and thus the valve will remain closed until the pressure in the combustion chamber has again lowered to a predetermined point.

While in the foregoing there has been shown and described the preferred embodiment of this invention, it is to be understood that such changes may be made in the combination and arrangement of parts as will fall within the spirit and scope of the appended claims.

What is claimed is:—

1. In a combustion chamber for reversible rotary motors, a combustion chamber having an opening at one end for communication with a motor, the opposite end of said chamber having an air and fuel inlet opening, a fuel pipe leading to the opening, an air pipe leading to the opening, a valve controlling the admission of fuel and air to the air and fuel pipe, a cylinder communicating at one end with the chamber, a piston operable within the cylinder, means controlled by the speed of the motor to open the valve to admit fuel and air to the combustion chamber and means controlled by the piston to prevent the opening of the valve when the pressure in the chamber exceeds a predetermined point.

2. In a combustion chamber for rotary motors, a cylindrical chamber having an outlet opening at one end for admitting its contents to a motor, the said chamber being provided with a fuel inlet opening at its opposite end and having a cylinder communicating with the interior thereof immediately above the inlet opening, air inlet and fuel pipes communicating with the inlet opening, a piston slidable in the cylinder, mechanically operated means for opening the air inlet and fuel inlet pipes to admit fuel to the interior of the chamber and means controlled by the piston for rendering the mechanical means inoperative when the pressure in the chamber exceeds a predetermined point.

3. In a device of the class described, a combustion chamber having an outlet port at one end and an inlet port at the opposite end, an air inlet pipe communicating with the inlet port, a fuel inlet pipe within the air inlet pipe and having its mouth disposed at the inlet port, a valve controlling the admission of air and fuel to the chamber, a cylinder communicating with the chamber, a lift arm for moving the valve upwardly to admit air and fuel to the chamber, mechanically operated means for controlling the movement of the lift arm and means controlled by the piston for rendering the mechanically operated means inoperative.

4. In a device of the class described, a combustion chamber having an outlet port at one end and an inlet port at the opposite end, a cylinder communicating with the chamber, a piston operable in the cylinder, a spring normally urging the piston toward the chamber, air and fuel inlet means communicating with the inlet port, a valve controlling the admission of air to the air and fuel inlet means, a lift arm for moving the valve to admit air and fuel to the chamber, a governor controlling the movements of the lift arm and means connected with the piston to prevent the operation of a lift arm when the pressure in the chamber exceeds a predetermined point.

5. A device of the class described including a combustion chamber having an outlet port at one end and an inlet port at the opposite end, a firebrick lining for said combustion chamber, a cylinder communicating with the combustion chamber, a piston operable in the cylinder, a spring normally urging the piston toward the combustion chamber, a connecting rod connected to the piston, a rocker arm connected to the opposite end of the connecting rod and adapted to be controlled by the movements of the piston, air and fuel inlet pipes communicating with the inlet port, a valve controlling the admission of air and fuel to the air and fuel inlet pipe, a lift arm for moving the valve to open position, a governor for controlling the movement of the lift arm and means connected to the rocker arm for preventing the movement of the lift arm by the governor when the pressure in the cylinder exceeds a predetermined point.

6. In a device of the class described, a combustion chamber having an outlet port at one end and an inlet port at the opposite end, a water jacket surrounding said chamber, a cylinder communicating with the chamber at one end, a piston operable within the cylinder, the cylinder being surrounded by the water jacket, air and fuel inlet pipes communicating with the chamber through the inlet port, said pipes being surrounded by the water jacket, a valve controlling the admission of air and fuel to the air and fuel inlet pipe, a sleeve surrounding the valve intermediate its ends, an arm on the sleeve, a lift arm for engagement under the arm, a governor for controlling the operation of the lift arm and means connected through the piston for preventing the opening of the valve when the pressure in the chamber exceeds a predetermined point.

7. In a device of the class described, a combustion chamber, a fuel mixing and feed controlling valve for controlling the admission of fuel and air to the combustion chamber, speed controlled means to operate the valve and pressure controlled means to render the valve inoperative.

8. In a device of the class described, a combustion chamber, a fuel mixing and feed controlling valve for controlling the admission of fuel and air to the combustion chamber, speed controlled means to intermittently operate said valve and pressure controlled means to prevent the speed controlled means from operating the valve.

9. In a device of the class described, a combustion chamber, a fuel mixing and feed controlling valve for controlling the admission of fuel and air to the combustion chamber, speed controlled means to operate said valve and means to prevent the speed controlled means from operating said valve.

10. In a device of the class described, a combustion chamber, a fuel mixing and feed controlling valve for controlling the admission of fuel and air to the combustion chamber, means to operate said valve and means to render the valve operating means inoperative when the pressure within the chamber exceeds a predetermined point.

11. In a device of the class described, a combustion chamber, a valve controlling the admission of fuel and air to the combustion chamber, speed controlled means for opening and closing the valve, and means to prevent speed controlled means from operating the valve when the pressure in the combustion chamber exceeds a predetermined point.

12. In a device of the class described, a combustion chamber, a valve controlling the admission of fuel and air to the combustion chamber, a governor speed controlled means to intermittently open and close the valve, and means to prevent the valve from opening when the pressure in the combustion chamber exceeds a predetermined point.

13. In a device of the class described, a combustion chamber, a valve controlling the admission of fuel and air to the combustion chamber, a lever and link mechanism to open and close the valve and means to prevent the valve from opening when the pressure in the combustion chamber exceeds a predetermined point.

14. In a device of the class described, a combustion chamber, a fuel mixing valve for admitting fuel and air to the combustion chamber, speed controlled means, a shaft driving said speed controlled means, a flange mounted on said shaft, sliding cams mounted within the flange and controlled by the speed controlled means and means actuated by contact with the ends of the cams for controlling the movements of the valve.

15. In a device of the class described, a combustion chamber, a fuel mixing valve for admitting fuel and air to the combustion chamber, speed controlled means, a flange rotatable adjacent the speed controlled means, sliding cams mounted within the flange and controlled by the speed controlled means, and a lever and link mechanism for actuating the valve by contact with the cams.

16. In a device of the class described, a combustion chamber, a fuel mixing valve for admitting fuel and air to the combustion chamber, a lever and link mechanism controlling the movements of the valve, a rotating flange, sliding cams mounted within the flange, speed controlled means controlling the movements of said cams, and means controlled by the pressure within the combustion chamber for rendering the lever and link mechanism inoperative.

17. In a device of the class described, a combustion chamber, a fuel mixing valve for admitting fuel and air to the combustion chamber, a lever and link mechanism controlling the movements of the valve, a rotating flange, sliding cams mounted within the flange and speed controlled means controlling the movements of the cams, the lever and link mechanism being controlled by contact with the cams, and a sliding block actuated by the pressure within the combustion chamber and adapted to be moved out of the path of one of the levers to prevent the operation of the valve when the pressure within the combustion chamber exceeds a predetermined point.

18. In a device of the class described, a combustion chamber, a mixing valve for admitting fuel and air to the combustion chamber, a cylinder at one end of the combustion chamber, a piston slidable in the cylinder, a lever and link mechanism for lifting the valve, a block carried by one of the levers and connected to the piston so that the pressure within the cylinder will move the piston to move the sliding block out of operative position and speed controlled means for controlling the movements of the lever and link mechanism.

19. In a device of the class described, a combustion chamber, a fuel admission tube at one end of said combustion chamber, a valve for closing the inlet end of the fuel admission tube, said valve being hollow, a valve within the first mentioned valve for controlling the admission of fuel to the device, the first mentioned valve being adapted to simultaneously mix air with the fuel and admit air to the combustion chamber, means for actuating said valves, a spring normally holding said valves closed, a rotating flange, sliding cams in the flange, wedges for forcing said cams outwardly, springs to normally urge the cams inwardly, the valve actuating means adapted to be engaged by the outer ends of the cams and thereby operate the valve, the distance of opening of the valve being controlled by the positions of the cams.

20. In a device of the class described, a combustion chamber, a fuel admission tube at one end of said combustion chamber, a valve for closing the inlet end of the fuel admission tube, said valve being hollow, a valve within the first mentioned valve for controlling the admission of fuel to the device, the first mentioned valve being adapted to simultaneously mix air with the fuel and admit air to the combustion chamber, means for actuating said valves, a spring normally holding said valves closed, a rotating flange, sliding cams in the flange, wedges operating through said flange for forcing said cams outwardly, springs to normally urge the cams inwardly, the valve actuating means being adapted to be engaged by the outer ends of the cams to actuate the valve, the distance of opening of the valve being controlled by the positions of the cams, and means actuated by the pressure within the combustion chamber to render the valve actuating means inoperative.

21. In a device of the class described, a combustion chamber, a valve for admitting fuel and air to the combustion chamber, a lever and link mechanism controlling the movements of the valve, cams controlling the operation of the lever and link mechanism, means to adjust the cams to vary the length of stroke of the lever and link mechanism whereby the distance of the opening in the valve is controlled, and pressure controlled means for preventing the operation of the valve when the pressure in the combustion chamber exceeds a predetermined point.

22. In a device of the class described, a combustion chamber, a valve admitting fuel and air to the combustion chamber, a lever and link mechanism for controlling the movements of the valve, a rotating flange, cams slidable in the flange for engaging the lever and link mechanism to actuate the valve, wedges slidable through the flange to control the length of the cams projecting beyond the surface of the flange whereby the distance of opening in the valve is controlled, and pressure controlled means for preventing the opening of the valve when the pressure in the combustion chamber exceeds a predetermined point.

23. In a device of the class described, a combustion chamber, a valve controlling the admission of fuel to said combustion chamber, a valve actuating means for operating the valve, and speed controlled means for regulating the operation of said valve actuating means and simultaneously governing the distance of the opening of said valve.

24. In a device of the class described, a combustion chamber, a valve controlling the admission of fuel to said combustion chamber, a valve actuating means for operating the valve, speed controlled means for regulating the operation of said valve actuating means and simultaneously governing the distance of the opening of said valve, and pressure controlled means for rendering the valve actuating means inoperative.

25. In a device of the class described, a combustion chamber, a valve controlling the admission of fuel to said combustion chamber, a lever and link mechanism for actuating said valve, and speed controlled means for regulating the operation of said lever and link mechanism to govern the distance of opening of the valve.

26. In a device of the class described, a combustion chamber, a valve controlling the admission of fuel to said combustion chamber, a lever and link mechanism for actuating said valve, speed controlled means for regulating the movement of said lever and link mechanism to govern the distance of opening of the valve, and pressure controlled means for rendering the operation of the lever and link mechanism ineffective when the pressure in the combustion chamber exceeds a predetermined point.

27. In a device of the class described, a combustion chamber, a valve for admitting fuel to the combustion chamber, a lift arm for actuating the valve, a spring normally holding the valve closed, a rocker arm, speed controlled means for engaging one end of the rocker arm, a link mechanism connected to the rocker arm and to the lift arm whereby when the rocker arm is moved the valve will be opened, and pressure controlled means for preventing the rocker arm from actuating the lift arm when the pressure in the combustion chamber exceeds a predetermined point.

28. In a device of the class described, a combustion chamber, a valve for admitting fuel to the combustion chamber, a lift arm for opening said valve, a spring for normally holding said valve closed, a rocker arm, means for intermittently operating said rocker arm, and a link mechanism connecting the rocker arm with the lift arm, whereby the valve will be opened intermittently.

29. In a device of the class described, a combustion chamber, a valve for admitting fuel to the combustion chamber, a lift arm for opening said valve, a spring for normally holding said valve closed, a rocker arm, means for intermittently operating said rocker arm, and speed controlled means for governing the length of movement of the rocker arm and thereby govern the distance of opening of the valve.

30. In a device of the class described, a combustion chamber, a valve for admitting fuel to the combustion chamber, a lift arm for opening said valve, a rocker arm, a link mechanism connecting the lift and rocker arms, whereby upon movement of the rocker arm the lift arm will be actuated, a rotating disk, a plurality of sliding cams carried by the disk and adapted to project laterally therefrom, speed controlled means for governing the length of projection of the cams, the rocker arm being adapted to be engaged by the cams whereby the same is actuated, the length of movement of the rocker arm and valve being controlled by the projection of the cams beyond the disks.

31. In a device of the class described, a combustion chamber, a valve for admitting fuel to the combustion chamber, a lift arm for opening said valve, a rocker arm, a link mechanism connecting the lift and rocker arms, whereby upon movement of the rocker arm the lift arm will be actuated, a rotating disk, a plurality of sliding cams carried by the disk and adapted to project laterally therefrom, speed controlled means for governing the length of projection of the cams, the rocker arm being adapted to be engaged by the cams whereby the same is actuated, the length of movement of the rocker arm and valve being controlled by the projection of the cams beyond the disks, and pressure controlled means for rendering the link mechanism inoperative when the pressure in the combustion chamber exceeds a predetermined point.

32. In a device of the class described, a combustion chamber, a valve for controlling the admission of fuel to the combustion chamber, a lift arm for opening said valve, a rocker arm, a link mechanism connecting the rocker arm with the lift arm, a rotating disk engaging one end of the rocker arm, a plurality of cams slidable in the periphery of the disks adapted to project beyond the same, and speed controlled means for controlling the length of projection of the cams whereby the length of opening of the valve is governed.

33. In a device of the class described, a combustion chamber, a valve for controlling the admission of fuel to the combustion chamber, a lift arm for opening said valve, a rocker arm, a link mechanism connecting the rocker arm with the lift arm, a rotating disk engaging one end of the rocker arm, a plurality of cams slidable in the periphery of the disks adapted to project beyond the same, speed controlled means for controlling the length of the projection of the cams whereby the length of opening of the valve is governed, and pressure controlled means for rendering the lever and link mechanism inoperative.

In testimony whereof I affix my signature in presence of two witnesses.

GEO. A. BERTSCH.

Witnesses:
 WILLIAM H. BROOKE,
 THOMAS E. DOLAN.